United States Patent Office 3,134,656
Patented May 26, 1964

3,134,656
SEPARATION OF OXYGEN DIFLUORIDE
AND OZONE
John A. Donohue, Chicago, Ill., and William A. Wilson, Griffith, Ind., assignors to Standard Oil Company, Chicago, Ill., a corporation of Indiana
No Drawing. Filed Oct. 27, 1961, Ser. No. 148,039
9 Claims. (Cl. 55—71)

This invention relates to the production of oxygen difluoride ($OF_2$) and particularly oxygen difluoride essentially free of ozone ($O_3$); also the invention relates to the production of ozone essentially free of oxygen difluoride.

An electrolytic process is known for the production of gaseous mixtures including oxygen difluoride and ozone. Usually the product gas mixture from the electrolysis of hydrogen fluoride containing water, contains oxygen difluoride, ozone, oxygen ($O_2$) and hydrogen ($H_2$). The hydrogen is separable from the other compounds by bringing the mixture to liquid nitrogen temperature; the gaseous hydrogen is separated from the liquid ozone, oxygen difluoride and oxygen.

Ozone can be separated from oxygen difluoride by fractional distillation of the liquids; any oxygen present can also be separated from the ozone and oxygen difluoride by a fractional distillation of the liquids. However, operation with these compounds in the liquid state requires temperatures ranging from —112° C. (the boiling point of ozone) through —183° C. (the boiling point of oxygen). The separation of ozone and oxygen difluoride or ozone, oxygen difluoride and oxygen at more easily obtainable temperatures is economically desirable.

It is a primary object of this invention to separate ozone and oxygen difluoride (also oxygen containing) by a procedure not involving low temperature fractional distillation. Other objects of the invention will become apparent in the course of the detailed description thereof.

It has been discovered that solid adsorbents preferentially adsorb ozone when contacted with a mixture comprising ozone and oxygen difluoride at temperatures from about —160° C. to about +30° C. A particularly suitable solid adsorbent is silica gel. When the feed mixture includes oxygen and/or hydrogen, these two are not adsorbed to any significant degree by the solid adsorbent and pass out of the adsorption zone with the oxygen difluoride.

It has also been discovered that the solid adsorbent will take up liquid ozone, liquid oxygen difluoride, and (if present) liquid oxygen to a substantial degree when the contacting is at a temperature such that all of these compounds are in the liquid state. However, when the solid adsorbent containing the adsorbed ozone and oxygen difluoride (and oxygen) is warmed to a temperature of about —160° C., first, if present, the oxygen is desorbed and second the oxygen difluoride is desorbed, leaving the ozone alone on the solid adsorbent. Thus it is possible to separate selectively a mixture of ozone, oxygen difluoride and oxygen.

In the method of the invention, the gaseous feed mixture comprising oxygen difluoride and ozone is contained with a solid adsorbent. Any of the solid adsorbent materials which do not significantly catalyze the decomposition of ozone at the temperature of contacting may be utilized. Illustrative of these solid adsorbents are the porous metal oxides such as alumina, silica-alumina, silica-magnesia, magnesia, titanium oxide, and chromia. Other illustrative solid adsorbents are the adsorbent clays which may be either natural or activated by acid treating; some of these are fuller's earth and Attapulgus clay. The adsorbent zeolites may also be used. Activated charcoal is a suitable adsorbent.

The amount of adsorbent utilized in the invention is dependent upon the degree of separation desired, the particular temperature of contacting and the particular solid adsorbent being used. Silica gel is a particularly good adsorbent because when a transparent container is used as the contacting vessel, it is possible to observe the adsorption of the ozone. The adsorbed ozone imparts a blue coloring to the silica gel, a sharp "interface" shows in the bed of silica gel particles, and the movement of this interface through the bed permits easy determination of the end of the adsorptive capacity of the bed.

The contacting of the gaseous feed mixture and the solid adsorbent is carried out at a temperature from about —160° C. to about +30° C. Generally the lower temperature of contacting is about —100° C. and the upper temperature is about +10° C. More commonly the temperature of contacting ranges from about —100° C. to about —20° C.

In the more common operation, a feed stream comprising ozone and oxygen difluoride (and oxygen) is passed into a mass of solid adsorbent particles such as silica gel under conditions whereby essentially all of the ozone is adsorbed by the solid adsorbent; the product stream then comprises oxygen difluoride essentially free of ozone. It is entirely possible to produce a product stream free of, within analytical error, ozone.

The ozone may be recovered from the solid adsorbent by heating the solid adsorbent to a temperature at which the ozone is desorbed; or by applying a vacuum to the solid adsorbent at lower temperatures to desorb the ozone. It is to be understood that some of the feed mixture will remain in the spaces between the adsorbent particles in the contacting zone. Unless this mixture is removed, the recovered ozone will be contaminated with oxygen difluoride (and oxygen). In general, the mixture retained in the contacting zone leaves the zone first, and therefore may be diverted away from the product storage. Where the ozone is desired to be used in a diluted gaseous stream, the ozone may be desorbed by the use of a sweep gas such as air, helium, or nitrogen. Any gas which is inert to ozone or does not participate in subsequent reactions may be used. In general, when the desorption is carried out using a carrier gas (sweep gas) not strongly adsorbed by the adsorbent, the desorption is carried out at a temperature of about 0° C. to about +30° C.; but this can be done at very low temperatures such as —100° C. or lower.

ILLUSTRATIONS

A gaseous mixture of ozone, oxygen difluoride, oxygen, and hydrogen was produced by the use of an electrolytic cell using an electrolyte consisting of hydrogen fluoride and water. The cell used in this work was composed of a Kel-F cup covered by a stainless steel cap. The use of Kel-F allows the contents of the cell to be observed during the electrolysis. The cup was approximately 2" in diameter and 4" high. The diaphragm made from $\frac{1}{16}$" Kel-F sheet, was solid above the liquid level to prevent mixing of anode and cathode gaseous products, but perforated below the liquid level to allow free flow of the electrolyte. The nickel anode ($\frac{1}{16}$" x $1\frac{7}{8}$" x $2\frac{7}{8}$") and the black iron cathode ($\frac{1}{32}$" x $1\frac{7}{8}$" x 3") were held in place by slots in the cup wall and a Kel-F spacer. The electrode separation was $\frac{5}{8}$ inch. Nichrome wire leads were welded to each electrode and insulated from the steel cap with Teflon. The steel cap was provided with two openings on each side of the diaphragm. The anode inlet was connected, via a calibrated Kel-F transfer buret, to an HF cylinder. The fittings were of Monel, and the gas (nitrogen or helium) used to transfer the HF was also used as anode flush gas. A copper tube conducted the flush gas to the cathode inlet. This could be easily removed and water or other materials inserted. The vents on both sides of the cell were connected separately, via copper tubing, to a reflux condenser filled with Dry Ice-acetone (−78° C.). Any HF which passed the condenser was absorbed in sodium fluoride packed tubes. The HF free gases could then be passed into glass bubblers for analysis.

Current was obtained from a D.C. power line and stepped down with a variable resistance. The voltage and amperage were measured with standard meters.

The bubblers were filled with 200 ml. of a 2% KI solution. After each run the free iodine was titrated by the usual method using thiosulfate with starch as the indicator. The fluoride ion was also determined by the thorium chloranilate method. The amount of $OF_2$ formed can be calculated from the fluoride analysis directly. To determine ozone the iodine released by $OF_2$ is first calculated

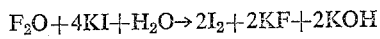
$$F_2O + 4KI + H_2O \rightarrow 2I_2 + 2KF + 2KOH$$

and subtracted from the analyzed iodine. The corrected value then gives the amount of ozone

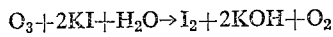
$$O_3 + 2KI + H_2O \rightarrow I_2 + 2KOH + O_2$$

The following is a generalized procedure for a series of tests. The cell was assembled and pressure tested with air at 10 p.s.i.g. The diaphragm was checked by filling the cell with water and raising the liquid level on one side. The cell was then sealed and set aside overnight. If the liquid level did not equilibrate the diaphragm was considered gas tight. The cell was then emptied and a measured amount of water was added. It was next placed in an ice bath (0° C.) and connected to transfer lines and condensers. After the desired amount of HF was transferred to the cell, a slow flow of helium was begun on one side of the diaphragm and a slow flow of nitrogen was begun on the other side of the diaphragm. This gave a fairly constant pressure on the system, activating the KI bubblers while keeping the electrolyte level undisturbed.

For the first 15 minutes after electrolysis was begun the products were usually vented. Then when the amperage and voltage had settled down and were fairly constant, the run was started by switching the product gases into KI bubblers. (Average values of voltage are reported in tests where they were not constant.) The test was continued until sufficient reaction occurred in the KI bubblers. Then electrolysis was stopped and the KI solutions were submitted for analysis. The water concentration of the cell was then increased and the series continued.

*Example 1*

In this particular run, the water content of the cell was about 2%. The gaseous mixture produced contained on the order of two moles of ozone per mole of oxygen difluoride.

The solid adsorbent was silica gel. Commercial silica gel particles were heated for about 30 minutes at about 105° C. using helium as a flushing gas; the heating was carried out in a glass column with heat furnished by a heat lamp.

The silica gel bed was made a part of the apparatus receiving a stream of gases from the cell. The gases directly from the cell were first passed through a Dry Ice condenser at about −80° C.; from the condenser the gas stream was passed through a sodium fluoride packed column and thence to the silica gel adsorber. The gas stream entered the glass column holding the silica gel bed above the top of the bed. A plug of absorbent cotton was placed at the bottom of the column to keep the silica gel in and another plug of absorbent cotton was placed above the bed of silica gel. A glass tube provided a bottom exit from the adsorption column; this tube was bent to afford a U below the column and then the tube passed upward parallel to the column and then was passed through a vessel maintained at about 25° C. From this vessel, a glass tube was passed into a solution containing potassium iodide. In this run the entire silica gel bed was placed in a pool of liquid nitrogen. A thermocouple placed approximately in the middle of the mass of silica gel particles showed temperatures ranging from −177° C. at the start of the run, rising to −152° C. at the end of the three hour run.

It was observed that the silica gel showed a blue coloration at about 30 minutes time, and at the end of the run approximately the upper ¾ inch of the silica gel was a deep blue color. There was no visible change in the color of the absorbent cotton at the top of the silica gel bed. During the operation of the cell, there was no indication of any reaction in the potassium iodide solution.

The liquid nitrogen bath was lowered exposing the silica gel bed to room temperature; simultaneously a sweep stream of helium was passed downflow through the silica gel bed—at this time the blue coloring occupied one inch of the upper section of the silica gel bed. After approximately 50 minutes, the thermocouple reading was −73° C. Gas was observed bubbling through the potassium iodide solution, but no visible reaction occurred; it is indicated that this gas was oxygen. At this time the blue coloring of the silica gel bed had reached a point 2 inches below the top of the bed, but the coloring was a lighter blue.

The U was immersed in liquid nitrogen and the helium sweep gas flow continued. A light-yellow liquid condensed in the U. The blue color in the silica gel moved downwards. When the interface was about 2 inches from the bottom of the bed of particles, the helium sweep gas was shut off. While the helium sweep was flowing during this period of the run, the potassium iodide solution was reacting at a tremendous rate. The potassium iodide reaction indicated this desorbed gas to be $OF_2$. The helium sweep was started and all of the $OF_2$ remaining in the U tube was flushed into a hood. During the approximately 60 minutes time of the $OF_2$ portion of the desorption, the thermocouple temperature changed from −64° C. to −29° C.

At this time the blue color interface was 1 inch from the bottom of the silica gel bed. Helium sweep gas was begun again and passed into the potassium iodide solution. Over a period of approximately 30 minutes, all of the blue color passed out of the silica gel; the final thermocouple reading was approximately −6° C. Analysis indicated that the gas desorbed during the blue color period of the run was pure ozone.

*Example 2*

In this example, a feed mixture of ozone, oxygen difluoride, oxygen and hydrogen was passed into the top of an elongated bed of silica gel particles, which bed was maintained at Dry Ice temperature (−78° C.). A blue interface appeared at the top of the bed; the run was terminated with respect to feed mixture introduction when the blue coloring occupied about one inch of the top of the bed. Analysis of the gases exiting from the silica bed showed oxygen difluoride present. The Dry Ice bath was removed and a helium sweep gas passed through the bed to desorb the ozone. Analysis of the desorbed ozone indicated an $OF_2$ content of about four mole percent. This $OF_2$ content was due to the fact that no attempt was made to segregate the feed mixture present in the silica gel bed before taking ozone product.

Ozone has a considerable use in the purification of drinking water, in the treatment of industrial wastes and in the deodorization of air and sewage gases. Oxygen difluoride is a powerful oxidizer and may be used for treating waste organic matter where no hazard to animal life is present. Another use for this compound is as a catalyst in the increasing important field of fluorinated polymers, such as, polytetrafluoroethylene production (U.S. Patent No. 2,757,167).

This application is a continuation in part of our copending application, Serial No. 141,175 filed September 27, 1961.

Thus having described the invention, what is claimed is:

1. A method of separating oxygen difluoride from admixture with ozone which method comprises contacting a feed mixture comprising oxygen difluoride and ozone at a temperature from about −160° C. to about +30° C., with a solid adsorbent, under conditions whereby substantially all of said ozone is adsorbed, leaving a product comprising oxygen difluoride substantially free of ozone.

2. The method of claim 1 wherein said adsorbent is silica gel.

3. The method of claim 1 wherein said temperature is about −100° C. to +10° C.

4. The method of claim 1 wherein said adsorbed ozone is desorbed to obtain a product comprising ozone substantially free of oxygen difluoride.

5. The method of claim 4 wherein said desorption is carried out at a temperature of about 0° C. to +30° C., using a carrier gas not strongly adsorbed by said adsorbent.

6. The method of claim 1 wherein said feed comprises ozone, oxygen difluoride, and oxygen.

7. A method of separating oxygen difluoride from admixture with ozone which method comprises passing a feed stream comprising ozone and oxygen difluoride into a mass of silica gel particles, at a temperature of about −100° C. to about +10° C., under conditions whereby essentially all of said ozone is adsorbed by said silica gel, and withdrawing a product stream comprising oxygen difluoride essentially free of ozone.

8. The method of claim 7 wherein said temperature is about −100° C. to about −20° C.

9. The method of claim 7 wherein said feed comprises ozone, oxygen difluoride and oxygen.

References Cited in the file of this patent

UNITED STATES PATENTS

| | | |
|---|---|---|
| 1,661,149 | Barnebey | Feb. 28, 1928 |
| 2,872,397 | Kiffer | Feb. 3, 1959 |
| 2,975,035 | Cook | Mar. 14, 1961 |
| 3,006,153 | Cook | Oct. 31, 1961 |